United States Patent Office 3,655,725
Patented Apr. 11, 1972

3,655,725
AMINOCYCLOPENTANECARBOXYLIC ACID DERIVATIVES
Harvey E. Alburn, West Chester, and William Dvonch, Radnor, Pa., assignors to American Home Products Corporation, New York, N.Y.
No Drawing. Continuation-in-part of abandoned application Ser. No. 753,879, Aug. 20, 1968. This application Oct. 16, 1970, Ser. No. 81,588
Int. Cl. C07c *101/36*
U.S. Cl. 260—468 R        4 Claims

ABSTRACT OF THE DISCLOSURE

The phenyl, menthyl, and choline halide ester of 1-aminocyclopentanecarboxylic acid are pharmacologically active, showing the ability to block the immune response in warm-blooded animals.

CROSS REFERENCES TO RELATED APPLICATIONS

This application is a continuation-in-part of Ser. No. 753,879, filed Aug. 20, 1968, now abandoned.

BACKGROUND OF THE INVENTION

This invention relates to compositions of matter classified in the art of chemistry as esters of 1-aminocyclopentanecarboxylic acid, which compounds exhibit utility in blocking the immune response in warm-blooded animals, as evidenced by standard pharmacological tests.

SUMMARY OF THE INVENTION

The invention sought to be patented as a composition of matter resides in the concept of a compound selected from the group consisting of the phenyl ester of 1-aminocyclopentanecarboxylic acid, the 1-menthyl ester of 1-aminocyclopentanecarboxylic acid, and the choline chloride ester of 1-aminocyclopentanecarboxylic acid, and the pharmaceutically acceptable acid addition salts thereof.

The tangible embodiments of the compositions of the invention possess in the acid-salt form the inherent general physical properties of being crystalline solids; are substantially soluble in water, and are soluble in ether and chloroform.

Examination of compounds produced according to the hereinafter described process reveals, upon infrared spectroscopic analysis, spectral data confirming the molecular structure hereinbefore set forth. The infrared spectrum shows an absorption frequency characteristic of ester carbonyl group. The aforementioned physical characteristics taken together with the nature of the starting materials and the mode of synthesis, positively confirm the structures of the compositions sought to be patented.

The tangible embodiments of the compounds sought to be patented possess the inherent applied use characteristics of inhibiting hind limb paralysis caused by experimentally induced allergic encephalomyelitis (EAE), evidencing utility in suppressing the immune response in warm blooded animals. The anti-immune activity is elicited in rats by measuring the degree of paralysis after injection into the hind paw with an emulsion containing guinea pig spinal chord, killed *M. tuberculosis,* and Freund's adjuvant. Active compounds give 80–100% protection as compared to untreated controls. This test is described generally by M. W. Brandriss, Science, 140, 186 (1963) and by S. Levine and E. J. Wenke, Proc. Soc., 114, 220 (1963). The compounds of the invention exhibit significant protection in the above-described test at an oral dose of 50–100 mg./kg. of body weight.

The manner and process for making the invention will now be generally described so as to enable a person skilled in the art of chemistry to make a specific embodiment of the same as follows:

DESCRIPTION OF THE PREFERRED EMBODIMENTS

When it is desired to prepare either the choline chloride ester or the 1-menthyl ester of 1-aminocyclopentanecarboxylic acid, a two-step procedure utilizing the Bergman synthesis starting from the N-carboxyanhydride of 1-aminocyclopentanecarboxylic acid (I) is followed as shown below:

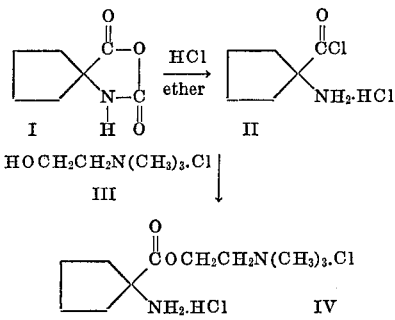

1-aminocyclopentanecarboxylic acid, N-carboxyanhydride (I) is first treated with hydrochloric acid in ether at about 0° C. to form the acyl halide acid addition salt of 1-aminocyclopentanecarboxylic acid (II) which is then esterified by reaction with an alcohol (III) to afford the final product (IV).

When it is desired to prepare the phenyl ester of 1-aminocyclopentanecarboxylic acid (VIII) a two step procedure starting with N-carbobenzoxy-1-aminocyclopentanecarboxylic acid is followed as illustrated below:

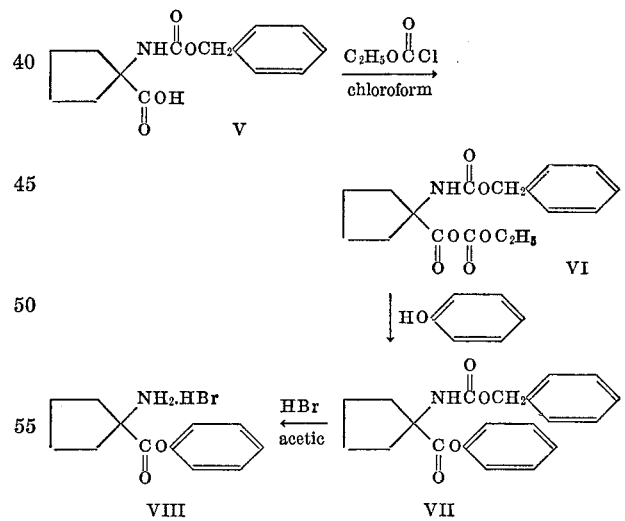

N-carbobenzoxy - 1 - aminocyclopentanecarboxylic acid (V) is reacted with ethyl chloroformate in chloroform in the presence of triethylamine to yield the mixed anhydride (VI), which is then treated with phenol to give the diester (VII). The carbobenzoxy group of the diester (VII) is cleaved by treatment with hydrobromic acid in acetic acid to give the final product (VIII).

The starting materials used in the synthesis of the final products of the invention as described above are known or are prepared from known compounds by well known procedures.

The methods described hereinbefore yield acid addition salts in which forms the compounds of the invention are purified and isolated. If it is desired, the free base may be prepared by procedures well known in the art of chemistry.

EXAMPLE I l-menthyl ester of 1-aminocyclopentanecarboxylic acid, hydrochloride 1-aminocyclopentanecarboxylic acid, N-carboxyanhydride (9.31 g., 0.06 mole) is added to 200 ml. of ether saturated with hydrogen chloride at 0° C. To this mixture is added 9.38 g. of l-menthol (0.06 mole) with good mechanical stirring. The system is allowed to come to room temperature. The reaction mixture is allowed to stand overnight and then is refluxed another 22 hours. The precipitate is filtered off and the ether solution extracted with 3× 100 ml. water. The aqueous phase is adjusted from pH 1 to 10.0 with solid sodium carbonate, and the milky suspension extracted with 3× 100 ml. portions of ether. The ether extract is dried over magnesium sulfate for several hours, filtered and treated with hydrogen chloride. Concentration of the solution gives the crude product, 4.9 g. M.P. 182° to 186° C. This material is dissolved in methyl alcohol, concentrated to dryness, redissolved in warm ether, and chilled to give clusters of fine needles, M.P. 185° to 186° C.

*Analysis.*—Calculated for $C_{16}H_{30}ClNO_2$ (percent): C, 63.30; H, 9.96; N, 4.62. Found (percent): C, 63.40; H, 10.04; N, 4.65.

Spectrum:

$$\lambda_{max.}^{KBr}$$

5.75 microns (ester carbonyl).

EXAMPLE II

Phenyl ester of 1-aminocyclopentanecarboxylic acid, hydrobromide

N-carbobenzoxy-1-aminocyclopentanecarboxylic acid (5.26 g., 0.02 mole) and triethylamine (2.76 ml. 0.02 mole) are dissolved in 20 ml. of chloroform, and the solution chilled to 0° C. Ethylchloroformate (1.88 ml. 0.02 mole) is then added. After 8 minutes, phenol (1.88 g. 0.02 mole) is added. The solution is refluxed for 2 minutes and then cooled. Chloroform is removed in vacuo. The resulting solid is dispersed in 50 ml. ethyl acetate, and the precipitated triethylamine hydrochloride filtered off. The ethyl acetate solution is reduced to an oil which is dissolved in 20 ml. of 30% hydrobromic acid in acetic acid. After 5 minutes the solution solidifies, and after 20 minutes, 100 ml. ether is added. Filtration of the precipitate yields 5.1 g. crude product, which is purified by two recrystallizations from methyl alcohol-ether (1 g./ml. alcohol/10 ml. ether) to give the title product.

*Analysis.*—Calculated for $C_{12}H_{16}BrNO_2$ (percent): C, 50.40; H, 5.64; N, 4.90. Found (percent): C, 50.14; H, 5.38; N, 5.19.

Spectrum:

$$\lambda_{max.}^{KBr}$$

5.71 (ester carbonyl) microns.

EXAMPLE III

Choline chloride ester of 1-aminocyclopentanecarboxylic acid, hydrochloride 1-aminocyclopentanecarboxylic acid N-carboxyanhydride (9.31 g. 0.06 mole) is added to 200 ml. ether saturated with hydrogen chloride at 0° C. and the mixture stirred for 30 minutes. To this mixture is added choline chloride (0.06 mole). The mixture is allowed to come to room temperature, after which it is refluxed overnight. Ether is then decanted from the gum, which is taken up in chloroform and the solution concentrated to dryness. The dissolving and concentration in chloroform is repeated two times. The gum is then dissolved in water and the solution freeze-dried to yield the title product.

*Analysis.*—Calculated for $C_{11}H_{24}Cl_2N_2O_2$ (percent): C, 46.0; H, 8.4; N, 9.8. Found (percent): C, 45.5; H, 8.7; N, 9.5.

Spectrum:

$$\lambda_{max.}^{KBr}$$

5.74 microns (ester carbonyl).

The invention claimed is:
1. A compound selected from the group consisting of the 1-menthyl ester of 1-aminocyclopentanecarboxylic acid, the phenyl ester of 1-aminocyclopentanecarboxylic acid, the choline chloride ester of 1-aminocyclopentanecarboxylic acid; and the pharmaceutically acceptable acid-addition salts thereof.
2. A compound as defined in claim 1, which is the 1-menthyl ester of 1-aminocyclopentaneboxylic acid.
3. A compound as defined in claim 1, which is the phenyl ester of 1-aminocyclopentanecarboxylic acid.
4. A compound as defined in claim 1, which is the choline chloride ester of 1-aminocyclopentanecarboxylic acid.

References Cited

The Merck Index, 8th edition, p. 224 (1968).

LORRAINE A. WEINBERGER, Primary Examiner

R. GERSTL, Assistant Examiner

U.S. Cl. X.R.

260—307 B, 463, 468 C; 424—305